(12) United States Patent
Meffre

(10) Patent No.: US 7,731,090 B2
(45) Date of Patent: Jun. 8, 2010

(54) DEVICE AND METHOD FOR CONTROLLING THE CALORIMETRIC QUALITY OF ANY PRINTED DOCUMENT

(76) Inventor: Wilfrid Meffre, 27 Rue Pierre Brossolette, Igny (FR) 91430

( * ) Notice: Subject to any disclaimer, the term of this patent is extended or adjusted under 35 U.S.C. 154(b) by 928 days.

(21) Appl. No.: 10/591,849

(22) PCT Filed: Mar. 4, 2005

(86) PCT No.: PCT/FR2005/000523

§ 371 (c)(1),
(2), (4) Date: Sep. 5, 2006

(87) PCT Pub. No.: WO2005/088265

PCT Pub. Date: Sep. 22, 2005

(65) Prior Publication Data

US 2007/0187511 A1  Aug. 16, 2007

(30) Foreign Application Priority Data

Mar. 6, 2004   (FR) .................................... 04 02380

(51) Int. Cl.
*G06K 7/14* (2006.01)
(52) U.S. Cl. .............. 235/454; 235/462.01; 235/462.04
(58) Field of Classification Search ............ 235/462.01, 235/462.09, 462.15, 375, 454, 462.04

See application file for complete search history.

(56) References Cited

U.S. PATENT DOCUMENTS

| 3,684,868 | A | 8/1972 | Chrisite et al. | |
| 2001/0007334 | A1* | 7/2001 | Wilz et al. | 235/462.15 |
| 2002/0079370 | A1* | 6/2002 | Wood et al. | 235/454 |

FOREIGN PATENT DOCUMENTS

| DE | 196 33 557 A1 | 3/1998 |
| FR | 2 698 982 | 6/1994 |
| WO | 01/57485 A | 8/2001 |

* cited by examiner

*Primary Examiner*—Ahshik Kim
(74) *Attorney, Agent, or Firm*—Young & Thompson

(57) ABSTRACT

A novel control device and a method for using the device for the calorimetric quality assurance of photographic documents or any color and monochrome products printed on any type of supports. The inventive control device is embodied in the form of an improved reflective spectrophotometer which also makes it possible to read bar codes. The use of the novel control device requires the use of a novel method which enables any user of a production machine to be assigned with an unique alpha digital identifier for any arbitrary product configuration leading to an arbitrary chromatic response (reflectance spectrum or colour spectrum obtained according to a printed file values) which are considered by the competent user as desirable and retainable for certain products.

28 Claims, 4 Drawing Sheets

DEVICE AND METHOD FOR CONTROLLING THE CALORIMETRIC QUALITY OF ANY PRINTED DOCUMENT

BACKGROUND OF THE INVENTION

The present invention relates to a new Control Device and its associated Process for calorimetric quality control of photographic documents and print works of any kind, produced by using any type of printer, printing press, textile impression machine, serigraphic machine, film recorder, photo processing machine, by using all sorts of inks, photographic pigments or toners, on all sorts of papers, paperboards, textiles or other media supporting the document. The concerned quality controls extend of course to computer to plates systems, which can be regarded as monochrome printers.

SUMMARY OF THE INVENTION

The various color or monochrome production devices of all sorts concerned by this invention, using computer files of all kinds, will be named hereafter under the generic term of "production machine". The verb "to print" will indicate the production of document by traditional color printing with an unspecified number of process colors, as well as any other production method of documents of photographic nature or else.

The industrial interest of this invention is to allow to any Person having in his hands a color or monochrome document to quickly and easily check by himself its spectral, calorimetric or densitometric conformity to an arbitrary standard, even if this Person is unaware of all the manufacturing process, of the origin and purpose of the document. By densitometric conformity we mean checking the optical densities compared to an arbitrary standard, as well as checking the apparent dot areas measured by spectrophotometers or optical densitometers, or the geometrical dot areas estimated by spectrophotometers or optical densitometers.

The new proposed Control Device is an enhanced reflection spectrophotometer, because this equipment has today the largest potential industrial market for Graphic arts and Photography. Moreover this type of spectrophotometer gradually replaces on these markets the old densitometers and calorimeters using colored or interferential filters, which are bound to disappear.

The use of this new Control Device is based upon a new process, which allows any User of a production machine, even if he is not equipped with this new Control Device but only with other control devices, (spectrophotometers, calorimeters or densitometers), to better manage the daily quality of his production machines, while participating to the creation and the enrichment of a universally accessible data base, allowing to any other Person having in hands a sample of a production (and to the User himself) to carry out a quality control, in a fast and reliable way by means of the Control Device.

Any qualified User of a production machine can be allotted a single alphanumeric identifier, for any arbitrary configuration of a production machine leading to an arbitrary chromatic response (reflections spectra or colors obtained according to the values of the printed file) which is considered by this qualified User as being desirable and to be retained for some productions.

This single identifier characterizes at the same time an arbitrary configuration of a production machine and all of the characteristics and measurement conditions of all quality control bars attached to this production. It is then represented on the document beside the one or more control bar(s) which have been chosen or designed by the qualified User of the production machine.

This makes it possible to any User of the Control Device to establish a diagnosis of acceptance or rejection of a production per automatic interrogation of the universally accessible data base, alternative processes being envisaged if this world data base is not accessible.

This also enables him to obtain much other useful information for the use of this production, such as for example, the co-ordinates of its manufacturer or the calorimetric profiles (of I.C.C. type for example) attached to the various elements composing the document, or the calorimetric profile of the production machine itself.

A control bar consists in a set of color patches, often printed in an adjacent way. It is printed in the margin of the document, or separately if not enough room is available in the margin of the document. This control bar is specified by a computer file memorizing the value of each color patch (specified for example by an RGB and/or CMYK and/or CMYKOG and/or C.I.E. XYZ value, depending on the type of data accepted by the production machine), its geometrical dimensions, and more generally all information allowing to print this control bar. These numerical values specifying the control bar are fixed, arbitrary, and are more or less well adapted to the quality control of the produced documents, depending on the level of expertise of their designer or User, who can be a Company or physical Person.

After having foreseen the reference values by calculation according to the calorimetric profile of the production machine (for example an I.C.C. profile as defined by the International Color Consortium, made in the rules of art by using spectral or calorimetric measurement of a large color test chart), or after having statistically measured them on one or more printed reference test forms during a production test, the User of the production machine knows in advance the spectral, calorimetric or densitometric values that should be measured on each color patch of one or more printed control bar(s), and the reasonable tolerances to be retained, when the document is correctly produced, or more precisely when the production machine works well, i.e. in accordance with its specifications or with an arbitrarily chosen calibration standard, during the impression of this document.

Each arbitrary using configuration of a production machine thus asks for one or more control bar(s), each one being specified by a computer file, and associated with a set of spectral, calorimetric or densitometric reference values, and accompanied by a set of all parameters specifying the measurement conditions having allowed to establish this set of reference values: for example the illuminant and angle of vision for calorimetric calculations, spectral response for densitometric calculations, model and brand of employed measuring instrument, possible optical filtering of its light source, measurement geometry, tolerances of acceptability etc.

For example it is usual for CMYK offset presses to print at least the four process inks Cyan, Magenta, yellow and Black, at 100%, 75%, 50%, 25%, 40% and 80% values. A densitometric control (for example) of these uniform patches composing a control bar printed parallel to the ink setting keys, indicates the respect of the quantity per unit of area of process ink deposited on paper for each process ink and for each specified density, and this, which is particular to offset printing, for each inking band perpendicular to the ink setting keys. The reference densities, colors or spectra and the measurement conditions of each color patch and the acceptable tolerances can be fixed by the expert User of the printing press, or by public or private national or international standardization organizations. For an offset press in a given configuration, a complementary control bar can be useful for controlling each offset plate.

For any production configuration, a calorimetric quality control requires at least checking the good adjustment of the machine in conformity with a state of arbitrary chosen or existing calibration, by using a main control bar (control of the constancy of colors reproduction), and sometimes requires in addition checking the conformity of the actually reproduced colors, compared to an arbitrarily selected color standard. (Control of the accuracy of reproduced colors, for example on a contractual color proofing system, obtained by simulation on a printer of the colors which would be obtained on an offset press of known chromatic response).

The main control bar is one making it possible to check the conformity of the production machine to an arbitrary chromatic response. This control bar makes it possible for example to check the color of each process color at its maximum density, the color of some tints obtained by superposition of two or more of these process colors, the color of the media. This control bar can be also based on checking the conformity of the densities of each process color at arbitrarily specified values, the densities being measured according to a usual standard spectral response, or according to a spectral response specifically tailored for each measured process color.

About densitometric controls let us specify that depending on the production machine being used, it is not always possible to print the pure process colors: for example on a domestic inkjet printer, one cannot print a control bar showing the pure cyan ink at various densities, since this printer only accepts RGB data and carries out an RGB to CMYK conversion in an internal way: in this case the control bar making it possible to check the constancy of the reproduced colors will be specified by a set of arbitrary RGB values, and the reference file will be a measurement file of produced colors, measured by their reflection spectra or by their apparent colors under a given illuminant.

And if this domestic inkjet printer is used to produce the simulation of an analogue color proof such as DuPont "cromalin" for example, one second control bar will be necessary (or at least desirable), to check that a set of colors defined by their CMYK values is actually reproduced by the printer with colors identical to those which would be obtained from these CMYK values on the analogue color proof.

It is thus always possible to define a control bar allowing to check the constancy of reproduced colors, and one or more desirable complementary control bars, so that the general principles described above are always applicable, even if it is not possible here to describe all the possible alternatives allowing to lead to the specifications of one or more control bar(s) for a production configuration.

The principle of the color quality control methods used today is insufficient, because on one hand they are to date very poorly understood and little or very partially implemented (only one control bar is generally used, even when the printing configuration would require more of them), and on the other hand they are only usable in practice by a User or a Customer of the document if he knows the reference values associated with the control bar he found in the document margin.

This situation is completely unsuited to the multiplication of color or monochrome production machines available on the market, and to the variety of technical and commercial uses which are made of them today: Even when he receives a printed paper form provided with control bar(s) and he measures their calorimetric, densitometric or spectral values, the document User does not have in practice any idea of the reference values for controlling the document, and often he does not even know the measurements conditions nor the tolerances.

Indeed, on one hand these reference values are not necessarily fixed values, nor even determinable in practice by standardization organizations. It can be for example a printed paper form produced on some wide format inkjet printer of the market, used with software driver, inks and paper unknown of the document User. In this case only the qualified User of the production machine has been able to design or choose control bar(s) allowing checking the correct operation of this production machine, and then determine the associated reference values, within the framework of the internal color quality policy of his Company, all of this being unknown by the User of the document. And for a same designed or chosen control bar, each production machine requires the creation of several distinct sets of reference values, according to each combination (ink+media+selected calibration standard), and also according to the use which is made of this production machine (simulation of a scanned original, of a monitor, of another production machine, of an offset press etc.).

And in addition, the standardization organizations acting in the field of CMYK offset printing publish a set of calorimetric or densitometric reference values for each major kind of offset paper, but these papers are not always identifiable without error by the User or the Customer of the document. For example, only for the control of digital proofs produced to simulate the CMYK offset presses, the German organization FOGRA defined to date, according to major types of simulated papers, presses and plates, several dozens of distinct sets of reference calorimetric values (in C.I.E. Lab D50), only for their arbitrary control bar named Fogra MediaWedge 2, which is specified by a same set of arbitrary CMYK numerical values (46 CMYK color patches distributed on two lines of 23 adjacent patches, measurable in a few seconds by a simple manual spectrophotometer by continuous sweeping of each of theses two lines). This type of standardization imposes moreover a standardization of the CMYK inks which are employed, to be able to limit the number of reference values sets to be published, which inevitably does not go in the sense of progress and flexibility: one exhumed an old standard for CMYK offset inks which had never been applied, at the moment when technology would allow more flexibility and can allow using better inks.

Lastly, even the producer of the document, which often uses many different production machine, with many kind of inks and media, can be easily mistaken when he works again an old archived file which he printed a long time ago: He has problems to find back without error the reference values to be measured on his own control bar(s), (for example for checking if the colors were not degraded because of the ageing of the pigments or the media), because these reference values depend on the model and version of the production machine, on its firmware (internal machine software) version, on the equipment update, on the version of the software drivers or PostScript RIP (a software converting a file describing a document composed of images data and of vector data describing text and line work), on the type and brand of used process inks, on the type and brand of used impression media: The simple combination of these parameters makes that a Company can have several hundreds of distinct chromatic response standards according to the applications, which will require as many distinct sets of reference values for checking even only one single arbitrarily specified control bar.

Consequently it is clear that it becomes essential that each User of a production machine is able to design or choose by himself one or more control bar(s) specifically adapted to each configuration of each one of his production machines, and is able to produce documents providing not only these adapted control bar(s), but also the means allowing everybody to know all the useful technical specifications for quality control: at least the reference values to be measured on this (or these) control bar(s), tolerances of acceptability and all information related to the measurement conditions.

To answer theses new expressed needs, the Control Device object of this invention thus consists of a reflection spectrophotometer, enhanced to authorize, in addition to usual measurements (spectra, colors, densities), the reading of bar codes, thus authorizing a fast and sure calorimetric checking of any document by any Person having in hand this document.

This bar code, printed at the same time as the necessary or desirable control bar(s), represents a single alphanumeric identifier specific to a purely arbitrary configuration of the production machine having produced the document, and this single identifier makes it possible to find automatically all the necessary reference data, of which at least the reference values to be measured on this (or these) control bar(s), tolerances of acceptability and all information related to the measurement conditions.

Many other information concerning the realization or use of the document, such as for example calorimetric profile(s) (I.C.C. profiles for example) associated with the elements (text, line work, images) composing the document, can be very useful for the User of a document, so that the recordings of the world data base indexed by the single identifier will be able to contain very many other useful information.

After reading and decoding by the Control Device, this one automatically interrogates the data base, worldwide accessible per connection to a private or public world data network such as Internet, if needed via a local computer. This data base memorizes, for each value of an already allotted single identifier, the specification(s) of control bar(s), and the associated set(s) of reference values, and more generally any useful information for quality control or proper use of the document.

Any qualified User (Company or physical Person) creating or choosing, for one of his production machines in an arbitrary configuration, one or more complementary control bar (s), and determining or choosing for each control bar a set of reference values (spectra or colors or densities) can ask for a single identifier, and enrich by a new recording a world data base which memorizes all characteristics of the control bar(s) associated to this identifier by the qualified User.

The data base can also be enriched by standardization organizations acting in the field of printing works and by manufacturers of all sorts of documents production systems wishing to rationalize the operation of their equipments for the benefit of their Users, or for local or distant maintenance or technical support, or for creating new added value services.

The world data base, composed of centralized or distributed data, is under control of a synchronization program, which allots and manages the single alphanumeric identifiers.

Any modification of one of the control bar(s) related to a printing configuration, or the addition of an additional control bar, or any modification of the measurement conditions of one of the control bars implies the need of using a new identifier and redefining a new set of control bars associated to this new identifier.

Each single identifier can be transmitted to his applicant in any practical form: for example by transferring a bitmap or vector image of a bar code according to an arbitrary coding and in any form of existing or upcoming computer file, or by transmitting the single identifier itself in any form of arbitrary coding or representation, allowing a downloadable local computer program to print this identifier in a form of a bar code according to any arbitrary coding, or to create a printable computer file of any nature, representing the identifier in the form of a bar code according to an arbitrary coding. This bar code, or any form of representation of the single identifier according to any arbitrary coding, is incorporable into the document to be printed, or into the computer program generating or assembling the document, or into the production machine, or into its software driver, for an impression in the form of a bar code with the according control bar(s) in the margin of the document, when the production machine prints in the configuration for which the User created this (or these) control bar(s).

All or part of the world data base can if needed be distributed in each Company on a local Intranet Server locally storing only the necessary data for the daily needs of the document producer, of his partners, suppliers and customers. This local server is then synchronized with one or more Internet type synchronized servers, which memorize the worldwide accessible complete data base.

The local server can also store single identifiers allotted in advance by the distant program managing all the single identifiers and synchronizing all the data bases.

All or part of the data base indexed by single identifiers memorizing the control bar(s) and reference values attached to each arbitrary production configuration regularly used by the producer of the document, his partners or his customers, can also be transmitted, by any usual connection such as wired, wireless or infrared, to the Control Device of this invention, which can thus locally memorize the specifications, reference values, measurement conditions and tolerances associated with each control bar or set of control bars associated with each single identifier.

This makes it possible for the Control Device to work in an autonomous way when no connection is possible to a distant Intranet or Internet data base. The spectrophotometer can then accept or reject the controlled document, in an off-line autonomous way, by use of an internal data-processing program using its internal data base.

Given that a well designed main control bar for a production machine intended to check the stability of it's chromatic response can always consist of a few well selected color patches characterized by reference densities or apparent colors of under one standard illuminant, a complementary bar code could be provided to the User if needed, in addition to the single identifier, that would directly code the reference calorimetric and/or densitometric values of these strategic control patches, allowing to the Control Device a direct reading of these reference values coded in the form of bar codes, to establish a diagnosis is the absence of any response of an internal or distant data base.

It is on this latter point that the use of color one-dimensional bar codes may be interesting, though non essential: To allow direct coding on the document of a larger quantity of reference information usable directly by the Control Device without connection to the world data base, a monochrome linear bar code being largely sufficient for coding each single identifier.

Let us add finally that the distant or local Intranet program allowing any qualified User to specify for any production configuration all the elements allowing the calorimetric quality control of the document by any client, can provide assistance and added value services to this qualified User for the design of well adapted control bar(s), for the determination of their reference values, by using calorimetric profiles or the measurement files having allowed to establish these profiles, and for any necessary action in the possible event of abnormal differences between the reference values forecasted by calculation or measured during production test, and the values actually measured during the final production test intended to validate the recording of the production configuration, this validation allowing to obtain the single identifier.

This help could of course also be provided if abnormal drifts are detected thereafter during a production run, between measurements of the control bar(s) and their reference values recorded in the data base.

Several versions of the Control Device can be carried out: versions without display screen intended for a connected use by any usual data connection of wired, wireless or infra-red sort, and versions including in addition a display device such as LCD, red/orange/green electroluminescent diodes or else, as well as an integrated decision-making software. All versions can include a sound transducer delivering indications: For example beginning and end of measurement, decoding of a bar code succeeded or not, ongoing interrogation of a distant data base, acceptance or rejection of the document.

A simple monochrome one-dimensional bar code, readable by sweeping it with a simple light pen, makes it possible to code in a sure way a very large number of combinations, number large enough for each arbitrary printing configuration defined by any User being allotted a world single identifier. For example a bar code of 24 useful alphabetical characters in Coding 128 with narrow bars width of approximately 0,25 mm is printed over a 75 mm length, zones of silence not included (virgin patches on both sides of the bar code).

And since control bar(s) can be quickly measured today by manually sweeping them with a modern spectrophotometer (by manual move along a ruler) or automatically (movement along a rail for reading along the edge of a document or movement by an XY measurement table), it is logical (or at least very simple and inexpensive) to use a one-dimensional bar code and also read this bar code by linear sweeping using the Control Device of this invention.

There are very many ways of allowing a spectrophotometer to read bar codes, the simplest way consisting into adding to the body of a traditional spectrophotometer a market bar code reader operating by contact or at distance. Spectral measurements of color patches indeed require, for a good accuracy, a precise geometrical positioning of the spectrophotometer measurement aperture related to the document plan, and this precise positioning can be perfectly appropriate for reading bar codes by using simple and traditional devices.

Using one or more laser diodes of distinct emission frequencies with collimation optics, associated with one or more photosensitive sensors, filtered if needed, detecting the reflected light, allows reading without contact linear monochrome or color bar codes, a color bar code being considered as several bar codes printed in superposition, each one being printed with a color complementary to the color of the laser used for reading it.

DESCRIPTION OF THE PREFERRED EMBODIMENTS

Figure 1:
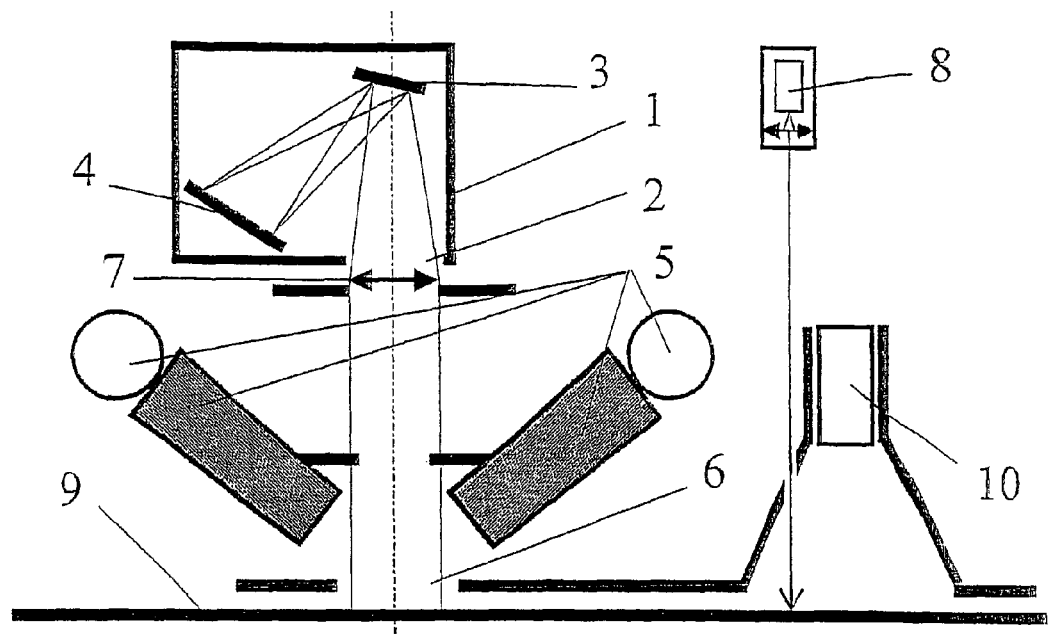
FIG. 1 shows a spectrophotometer with a laser diode provided with a collimated photosensitive element analyzing the light reflected by the plan of the document during bar code reading.

According to FIG. 1 a spectrophotometer can receive for example a laser diode (8), provided with a collimated photosensitive element analyzing the light reflected by the plan of the document (9) during the bar code reading.

The use of at least three primary colors Cyan, Magenta and Yellow for the vast majority of traditional printed or photographic color documents to be controlled, allows simultaneous reading of three one-dimensional independent bar codes printed in superposition, each one being printed with one of the three primary colors (or photographic pigment) Cyan, Magenta and Yellow, used with its maximum density for a good reading contrast.

One will then use three red, green, and blue laser diodes. (NB: when the green laser diode will exist, we will return there). It is not essential for reading bar codes that the three light beams converge perfectly to the same point of the reading plan, if their respective emission spectra do not or little overlap and this will allow if needed relatively low manufacturing costs as well as a good depth of field for reading color bar codes.

The bar code printed with a cyan color causes contrast in the red wavelengths. The bar code printed with a magenta color causes contrast in the green wavelengths. The bar code printed with a yellow color causes contrast in the blue wavelengths. Such a device remains adapted to reading traditional linear bar codes printed with black on clear background (for example by using only the red channel).

However offset printing inks Cyan and Magenta not being excellent (Cyan badly reflects blue under 400 nm), it is necessary to take precautions for the choice of the blue laser diode wavelength which should not be too close to ultraviolet but around 450 nm.

The three electric tensions corresponding to these three independent reading channels, and produced by three distinct groups of elements of the photosensitive array, are treated each one in independent and simultaneous way, like three outputs of three monochrome bar code scanners acting independently.

As green laser diodes do not exist yet to date (there are to date only some cumbersome and complex composite optoelectronic components producing a green laser light by optical pumping of a crystal by a non green laser diode), such a realization can be practical and economic to date only by using a red and a blue laser diode, then authorizing the use of two bar codes printed in superposition: a cyan and a yellow.

Figure 2:
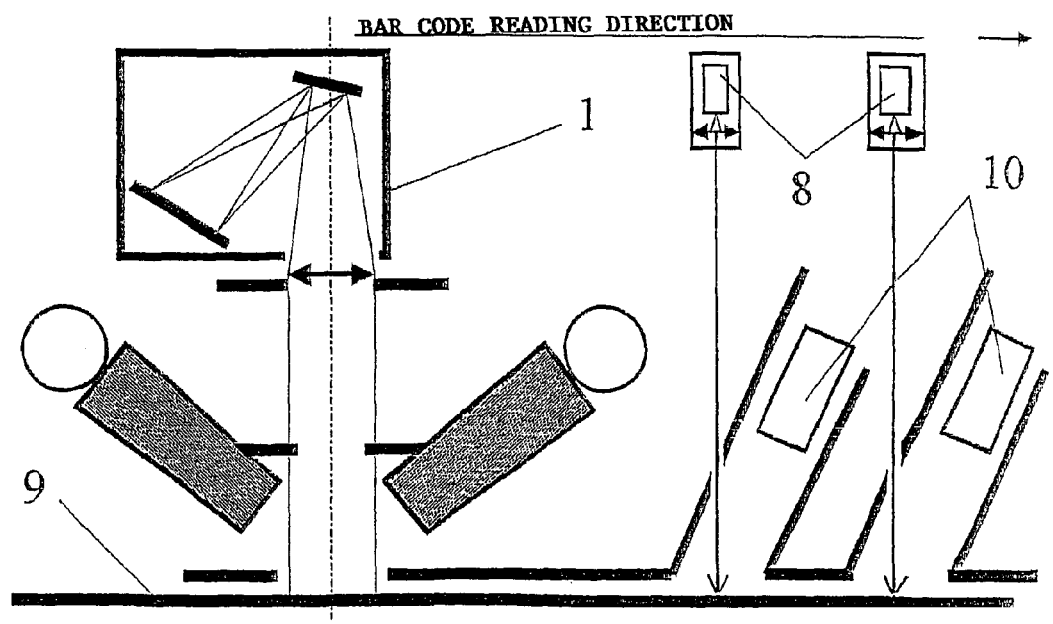
FIGS. 2-3 show spectrophotometers with two laser diodes of distinct wavelengths, each one being provided with a collimated photosensitive element analyzing the reflected light by the document plan while reading the bar code.
Figure 3:
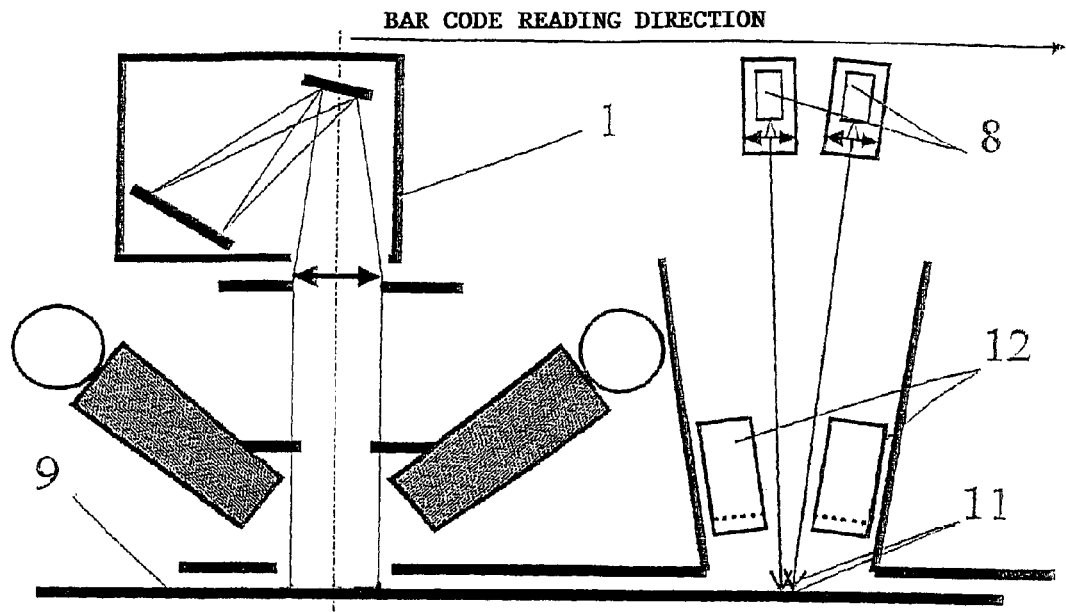

According to FIG. 2 a spectrophotometer can receive for example two laser diodes of distinct wavelengths (8), each one being provided with a collimated photosensitive element (10) analyzing the reflected light by the document plan (9) while reading the bar code. The physical offset between the two spots during a displacement from left to right or from right to left is not awkward, because each bar code scanner thus made up behaves in an independent way, because it sees only the process color which is affected to him in the color bar code.

The reflection spectrophotometer which this invention comes to enhance can be composed of several distinct elements allowing constituting several distinct configurations:

1. A diffraction grating spectral analyzer comprising the light entry aperture, a diffraction grating dispersing the light by reflection and an array of photosensitive elements measuring the intensity of the diffracted light on each visible or close to visible wavelengths.
2. Or a filter spectral analyzer using for measuring luminous spectra a set of narrow band filters assembled on a rotating barrel in front of a fixed photosensitive sensor measuring each band of the luminous spectrum through the successive filters.
3. An illuminator intended to illuminate with white light the color patch to be measured on a certain area. The light source can be flash lights, one or more incandescence bulbs, or one or more white electroluminescent diodes or any other light source offering a continuous visible and near ultraviolet spectrum, sufficient or desirable for the application.
4. According to usual conditions recommended by the C.I.E. the geometry of illumination of the illuminator can be usual 45/0°, 0/45° types, or of diffuse type Diffuse/0 or 0/Diffuse.
5. A measurement aperture defining the illuminated zone on the document of which reflection spectrum will be measured under these conditions,
6. The light reflected by the illuminated color patch can be transmitted to the spectral analyzer to be measured either by a simple collimated aperture without optics, or by an optical system, or by a flexible or rigid light conductor.
7. The area lit by the illuminator consists in general of a circle ranging from 3 to 15 mm in diameter, depending on the applications.

FIG. 1 illustrates a spectrophotometer with 45/0° geometry, with a spectral analyzer (1) receiving the light by the aperture (2) diffracted by a reflective grating (3) towards the photosensitive elements array (4). The document is lit by the measurement aperture (6) by means of a 45° illuminator (5), the document plan being located in (9).

Figure 5:
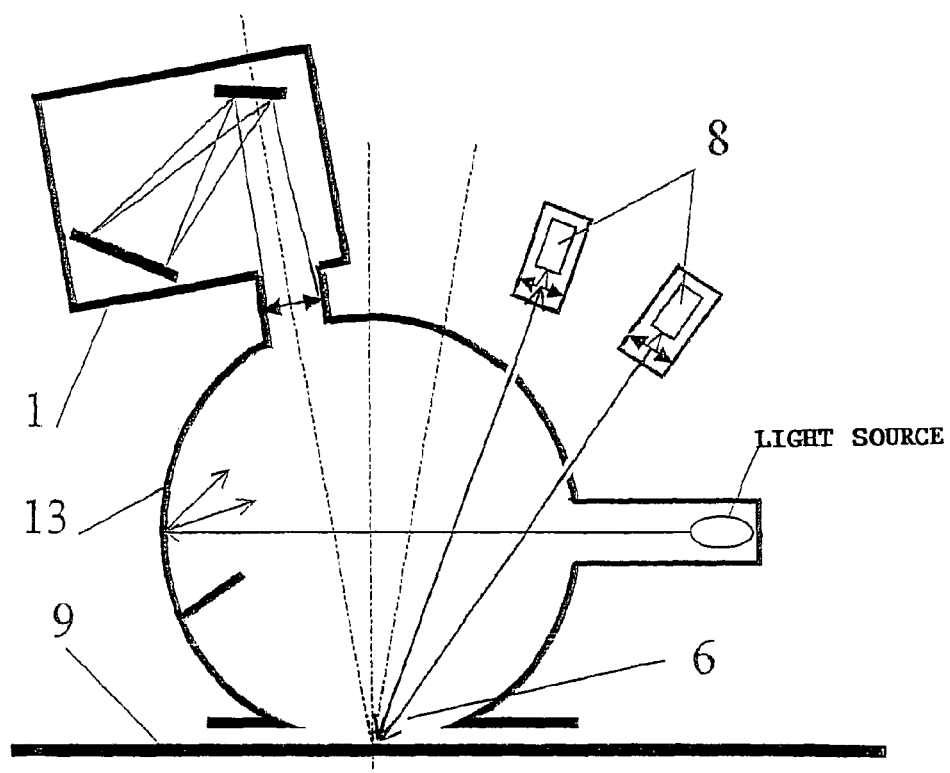
FIG. 5 illustrates a spectrophotometer with Diffuse/0 geometry, with a spectral analyzer using a diffraction grating and a photosensitive array.

FIG. 5 illustrates a spectrophotometer with Diffuse/0 geometry, with a spectral analyzer using a diffraction grating and a photosensitive array (1). The document is lit by the measurement aperture (6) by means of the sphere illuminator (13), the document plan being located in (9).

Figure 6:
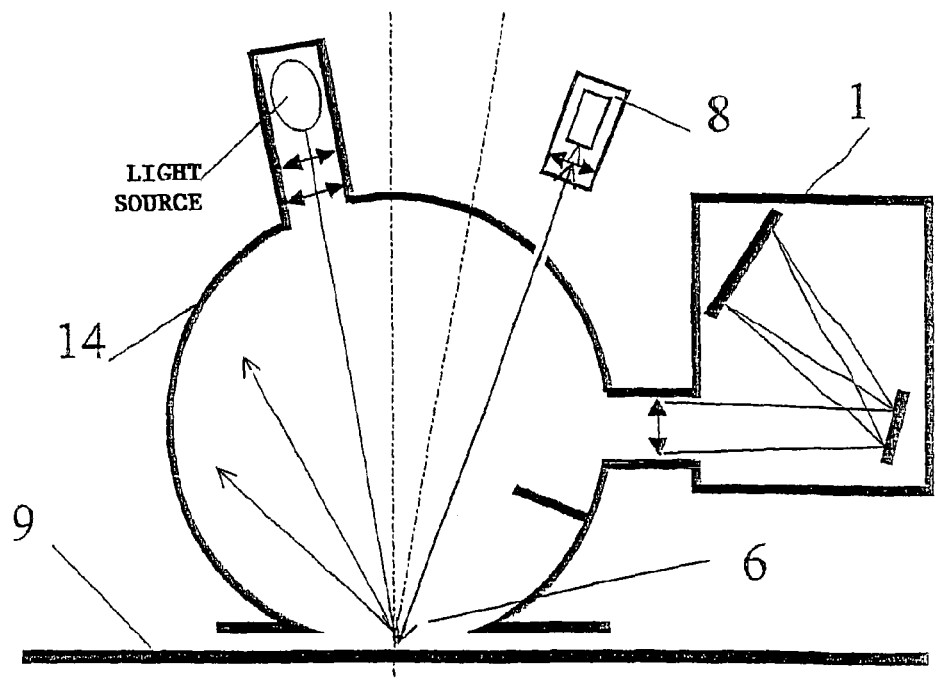
FIG. 6 illustrates a spectrophotometer with 0/Diffuse geometry, with photosensitive array and diffraction grating spectral analyzer.

FIG. 6 illustrates a spectrophotometer with 0/Diffuse geometry, with photosensitive array and diffraction grating spectral analyzer (1). The document is lit by the measurement aperture (6) by means of the sphere illuminator (14), the plan of the document being located in (9).

Figure 7:
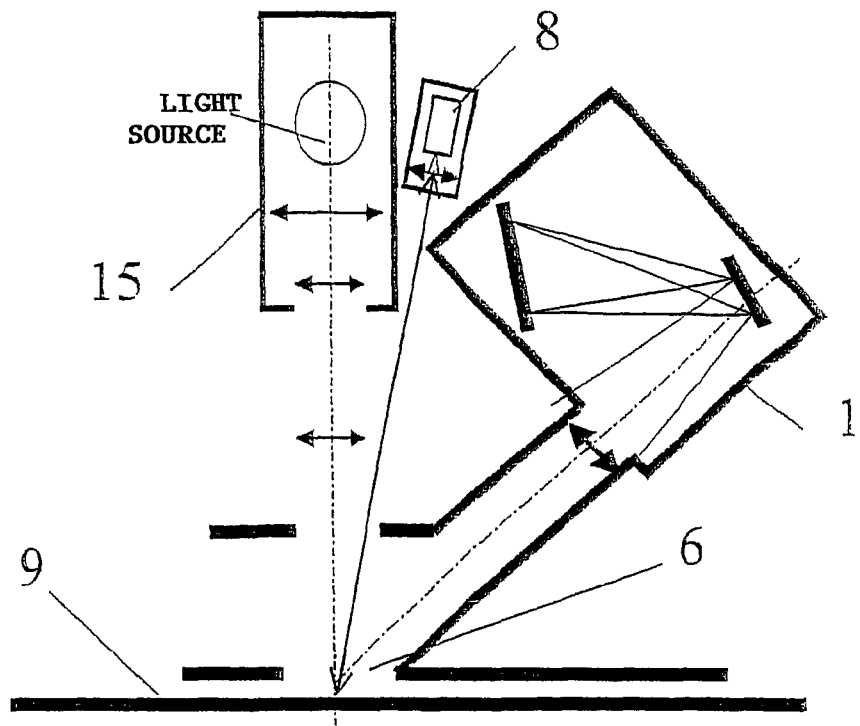
FIG. 7 illustrates a spectrophotometer with 0/45° geometry, with photosensitive array and diffraction grating spectral analyzer.

FIG. 7 illustrates a spectrophotometer with 0/45° geometry, with photosensitive array and diffraction grating spectral analyzer (1). The document is lit by the measurement aperture (6) by means of a 0° illuminator (15), the document plan being located in (9).

Figure 8:
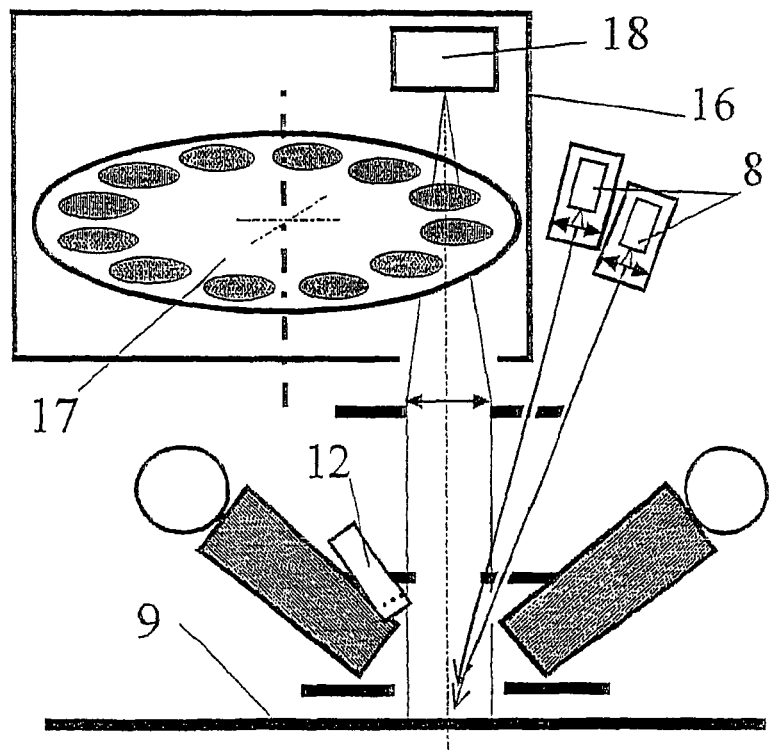
FIG. 8 illustrates a spectrophotometer with 45/0° geometry, with a band passing filters spectral analyzer (16) analyzing each of the spectrum bands by a rotating filters barrel (17) and a photosensitive element (18).

FIG. 8 illustrates a spectrophotometer with 45/0° geometry, with a band passing filters spectral analyzer (16) analyzing each of the spectrum bands by a rotating filters barrel (17) and a photosensitive element (18). The document is lit by the measurement aperture (6) by means of a 45° illuminator, the document plan being located in (9).

Above devices can be adapted to fast measurement of adjacent successive color patches by continuous and sufficiently regular manual sweeping. Indeed the high frequency of authorized measurement, (for example several tens to several hundreds of complete 32 bands reflection spectra measured per second, in the case of a spectral analyzer with diffraction grating used with photosensitive diodes simultaneously functioning in parallel), authorizes the recording of several complete reflection spectra for the same color patch during a sufficiently regular sweeping movement, at a speed of a few centimeters or tens of centimeters per second. Obtaining during the sweeping several successive rough complete spectra very close in numerical values means that the circle of illumination is not overlapping over two adjacent color patches and that the average value of these very close rough successive spectra can thus be retained as a valid spectral measurement of the color patch in the course of the line measurement, this gross spectrum measured in average value being then calibrated by a linearization carried out for each measured wavelengths band (Subtraction of the dark currents and scaling by a gain factor, these two coefficients being determined during a preliminary calibration by an integrated measurement without illumination, and then by the measurement of an internal or external reference ceramics of which reflection spectrum is known in advance).

The present invention proposes in addition using the spectrophotometer existing spectral analyzer or its existing measurement aperture to authorize, in addition to usual spectral measurements, fast and reliable reading of one-dimensional bar codes.

For reading bar codes, a laser diode provided with collimation optics is used so as to form in the plan of the document a light spot with adapted size for reading linear bar codes. If needed the optics associated to the laser diode is used to adjust a divergence or a convergence of the beam depending on the presence of optics met on the optical way, which are intended for operation of spectral measurements. The selected conformation position of the spot corresponds of course to the envisaged position of the document plan for reflection spectra measurement by the spectrophotometer. A depth of field can be obtained in practice for the formation of the spot which allows if needed reading bar codes by manual or automatic sweeping with or without physical contact between the spectrophotometer measurement aperture and the document.

For reading by sweeping traditional one-dimensional bar codes printed black on a white background, one diode is enough: for example a traditional red laser diode emitting at 650 nm. For color bar codes several laser diodes at distinct wavelengths can be used.

If the spectral analyzer uses a diffraction grating, the reflected light collected while reading a bar code is directed by the diffraction grating towards the existing photosensitive sensors intended for reflected light measurement at this wavelength during traditional use of the spectrophotometer. The possible variation of emission wavelength of the laser due to temperature drifts is not awkward if one uses the electric signals with a sufficient number of photosensitive elements defining an adapted range of wavelengths.

Figure 4:
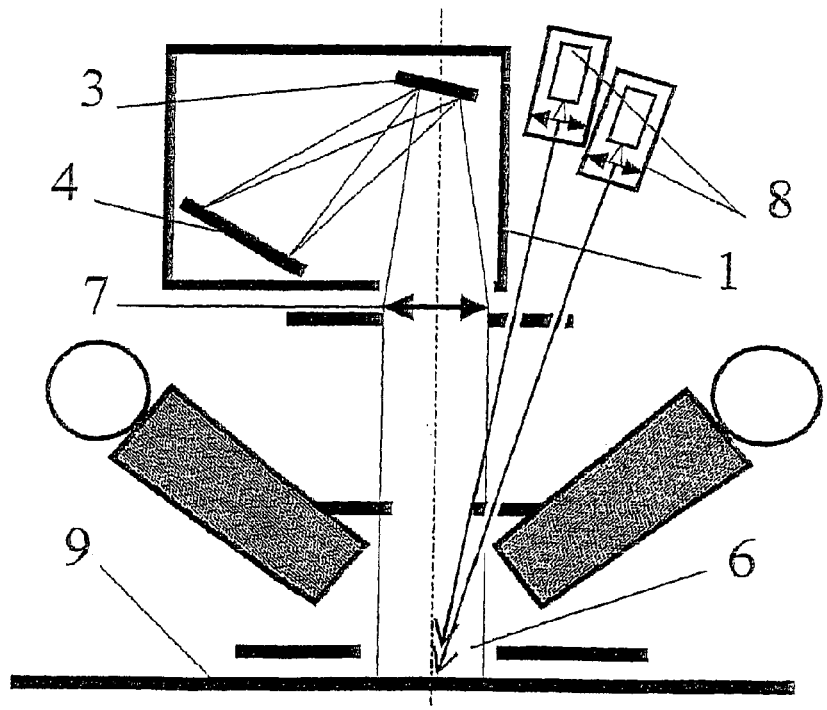
FIG. 4 illustrates a spectrophotometer with 45/0° geometry, with photosensitive array and diffraction grating spectral analyzer provided with two laser diodes.

FIG. 4 illustrates a spectrophotometer with 45/0° geometry, with photosensitive array and diffraction grating spectral analyzer (1) provided with two laser diodes (8). The document is lit by the measurement aperture (6) and the reflected light is detected by the spectral analyzer (1).

If the spectral analyzer uses a band pass filters rotating barrel, then during a bar code reading the barrel positions a band pass filter adapted to the luminous wavelength of the laser diode, allowing light transmission to the photosensitive element normally intended for spectral analysis. Using additional laser diodes of distinct colors for reading color bar codes requires the use of filtered photosensitive elements.

FIG. 8 illustrates a spectrophotometer with 45/0° geometry, with band passing filters spectral analyzer (16), provided with two laser diodes (8) and with one photosensitive element (18). The document is lit by the measurement aperture (6) and the reflected light is detected by the photosensitive element (18) and by a complementary sensitive element (12) filtered to the adapted wavelength of one of the two laser diodes.

In the two preceding cases the electric signal produced by the photosensitive sensor(s) is treated by usual methods of amplification, digitalization and decoding which can be found in any traditional bar code scanner, if needed by using specialized integrated electronic circuits available in the market.

The use of very fine light spots is intended for reading bar codes for using the spectrophotometer as a measuring instrument of reflection densities. Indeed some production machine such as web offset presses used for printing daily newspapers do not allow cutting the margins where the control bar(s) are printed, and thus preferably require a control of process inks densities on small sized color patches, in order not to invade too much the document.

The very fine luminous spot(s) designed for reading bar codes can then be used for the realization of spectral measurements after calibration on the spectrophotometer reference ceramics, in a not very orthodox way, when one considers the non standardized illumination geometry, and the spectral response thus carried out, but which remains of interest, if thus obtained densities are not used as absolute measurements but only in comparison with reference values acquired under the same measurement conditions.

Aiming accurately at the small size patch to be measured can be carried out by using a reticule with a hole, independent of the body of the Control Device.

The well adapted addition to the spectrophotometer of one or more the laser diodes and their associated optics, or of any other visible, infra-red or ultraviolet light source (white light, electroluminescent diode(s)) producing a size adapted light spot on the document, in a manner authorizing reading bar codes while using the measurement aperture provided for spectral measurements, depends of course on the measurement geometry of the spectrophotometer and on the optical coupling of the spectral analyzer to the illuminator.

The "spectrophotometer bar code scanner" thus realized can be used in manual mode (manual displacement along a ruler) or automatic (displacement along a rail for reading on the edge of the document or displacement by an XY measurement table).

To simplify the manual use of the spectrophotometer during the quality control of a document, and in order to avoid any danger for the eyes due to the possible use of one or more laser beams, a device makes it possible to use the same pushbutton for using the spectrophotometer for the measurement of control bar(s) per sweeping, and for the associated bar code reading, and this by the following mean:

8. A short press on the button allows manual measurement of only one color patch.
9. A maintained press on the button starts the continuous spectral measurement mode per sweeping, allowing the usual acquisition of a full line of color patches by manual movement guided by a ruler.
10. But in this last case the detection of an arbitrary sequence of successive color patches at the beginning of a line measurement (for example black-white-black-white-black) automatically commutates the spectrophotometer in bar code reading mode, by extinction of its illuminator and by lighting of its diode(s) dedicated to bar codes. A non printed zone (zone of silence of the bar code) must of course be provided, between the end of the special sequence of arbitrary colors commutating the spectrophotometer and the first printed bar of the bar code.

In practice two pushbuttons placed on both sides of the body of the Control Device and functioning in parallel allow a convenient use by left and right handed Persons.

Lastly, to allow any User not equipped with the Control Device, but equipped with other measuring instruments (Spectrophotometer, calorimeter, or densitometer) to enrich the world data base, or to read a color bar code found on a document, a color bar code scanner device is proposed. This will make it possible to extend the use of the world data base to controlling the offset plates by using plate readers operating by digital image acquisition and processing for the direct determination of geometrical dot areas, to the control of screened Graphic arts films and more generally to all controls requiring using instruments other than the Control Device, such as densitometers or spectrophotometers by transmission, densitometers for flexography etc., the color bar codes being if needed printed on sticking labels.

The invention claimed is:

1. A method for ensuring the colorimetric quality of a document output by a production machine and including a control range, which comprises the following steps:
   a) the arbitrary choice of at least one of the following data:
      i) at least one control range,
      ii) theoretical reference values to be measured over said at least one control range,
      iii) acceptability tolerances and
      iv) information relating to the conditions for measuring the ii) and iii) values;
   b) the recording of the data a)i) to a)iv) and their coding in the form of a unique identifier; and
   c) the incorporation into the document, of said unique identifier, in any arbitrary representational or coding form; it being possible, by reading said unique identifier, to identify said data a)i) to a)iv) and to measure, under the conditions as defined in a)iv), actual reference values of the control range of the document, while comparing said actual values with those theoretical values defined in a)ii), taking into account the tolerances as defined in a)iii), makes it possible to verify the colorimetric quality of the document.

2. The method as claimed in claim 1, wherein information regarding the configuration of the production machine is also chosen, recorded and coded by said unique identifier.

3. The method as claimed in claim 1, wherein the choice of all or part of the data a)i) to a)iv) is made from predefined data of control ranges devised by public or private organizations.

4. The method as claimed in claim 1, wherein said reference values of step a)ii) are spectral, colorimetric or densitometric values.

5. The method as claimed in claim 4, wherein the information associated with the measurement conditions of step a)iv) are the illuminant used, the viewing angle for the colorimetric calculation, the spectral response for the densitometric calculations, the type and brand of the apparatus used for this measurement, the optical filtering and the measurement geometry.

6. The method as claimed in claim 1, wherein the recording and the coding of said data of step b) take place on a database and in that the data is identified by connection to said database, said unique identifier being an index of said database.

7. The method as claimed in claim 6, wherein said database is accessible by linking to an Internet-type computer network or via a local Intranet server storing only the necessary data, or via a standard wire, radio or infrared link.

8. The method as claimed in claim 1, which includes a step of converting said unique identifier into a barcode.

9. The method as claimed in claim 8, wherein the conversion step is carried out by calculating and transmitting a bitmap or vector image of the barcode according to an arbitrary coding and in any form of computer file, or by transmitting the unique identifier itself, in any form of coding or arbitrary representation, allowing a local computer program to print this identifier in the form of a barcode.

10. The method as claimed claim 8, wherein the barcode is a monochrome or color, linear barcode.

11. The method as claimed in claim 1, wherein step c) is carried out by incorporating, into said document, said unique identifier, by a computer program that contributes to the production of the document, with a view to its reproduction alongside the at least one control range.

12. The method as claimed in claim 8, wherein said barcode is read by means of a modified spectrophotometer in order to allow reading by scanning said control range and said barcode.

13. A spectrophotometer for implementing the method as claimed in claim 8, wherein said barcode is read by means of a modified spectrophotometer in order to allow reading by scanning said control range and said barcode, said modified spectrophotometer comprising:
   a light spectrum analyzer having a light entry aperture;
   an illuminator designed to illuminate said document produced over part of its surface;
   a measurement aperture defining the illuminated area of the document, the reflection spectrum of which is measured, as is the barcode;
   an optical link transmitting the light reflected by the illuminated color area to the spectrum analyzer;
   a specialized electronic circuit, or software, which corrects the raw spectrum measured by scanning, over each measured wavelength band, by measuring in the absence of light and by measuring a known reflection spectrum standard;
   at least one light source and its collimation optic, producing a visible, infrared or ultraviolet light spot whose size and wavelength are matched to the reading of the barcodes, and a photosensitive element that detects the reflected light when a barcode is being scanned; and
   an electronic processing circuit for shaping and decoding the received signal when a barcode is being scanned.

14. A spectrophotometer for implementing the method as claimed in claim 8, wherein said barcode is read by means of a modified spectrophotometer in order to allow reading by scanning said control range and said barcode, said modified spectrophotometer comprising:
   a light spectrum analyzer having a light entry aperture;
   an illuminator designed to illuminate said document produced over part of its surface;
   a measurement aperture defining the illuminated area of the document, the reflection spectrum of which is measured, as is the barcode;
   an optical link transmitting the light reflected by the illuminated color area to the spectrum analyzer;
   a specialized electronic circuit, or software, which corrects the raw spectrum measured by scanning, over each measured wavelength band, by measuring in the absence of light and by measuring a known reflection spectrum standard;
   at least one light source and its collimation optic, producing a visible, infrared or ultraviolet light spot whose size and wavelength are matched to the reading of the barcodes, and a photosensitive element that detects the reflected light when a barcode is being scanned; and
   an electronic processing circuit for shaping and decoding the received signal when a barcode is being scanned; said spectrum analyzer or said measurement aperture also allowing the barcode to be read.

15. A spectrophotometer for implementing the method as claimed in claim 8, wherein said barcode is read by means of a modified spectrophotometer in order to allow reading by scanning said control range and said barcode, said modified spectrophotometer comprising:
   a light spectrum analyzer having a light entry aperture;
   an illuminator designed to illuminate said document produced over part of its surface;
   a measurement aperture defining the illuminated area of the document, the reflection spectrum of which is measured, as is the barcode;
   an optical link transmitting the light reflected by the illuminated color area to the spectrum analyzer;
   a specialized electronic circuit, or software, which corrects the raw spectrum measured by scanning, over each measured wavelength band, by measuring in the absence of light and by measuring a known reflection spectrum standard;
   at least one light source and its collimation optic, producing a visible, infrared or ultraviolet light spot whose size and wavelength are matched to the reading of the barcodes, and a photosensitive element that detects the reflected light when a barcode is being scanned; and
   an electronic processing circuit for shaping and decoding the received signal when a barcode is being scanned; said light spectrum analyzer using a diffraction grating and a linear array of photosensitive elements measuring the intensity of the diffracted light over each visible and near-visible wavelength band.

16. A spectrophotometer for implementing the method as claimed in claim 8, wherein said barcode is read by means of a modified spectrophotometer in order to allow reading by scanning said control range and said barcode, said modified spectrophotometer comprising:
   a light spectrum analyzer having a light entry aperture;
   an illuminator designed to illuminate said document produced over part of its surface;
   a measurement aperture defining the illuminated area of the document, the reflection spectrum of which is measured, as is the barcode;
   an optical link transmitting the light reflected by the illuminated color area to the spectrum analyzer;
   a specialized electronic circuit, or software, which corrects the raw spectrum measured by scanning, over each measured wavelength band, by measuring in the absence of light and by measuring a known reflection spectrum standard;
   at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; said light spectrum analyzer is a filter spectrum analyzer using, for measuring the light spectra, a set of narrow-band filters mounted on a revolving turret passed a photosensitive element that measures each band of the light spectrum through the successive filters as the turret revolves, a monochrome barcode being read by means of a spot of a single wavelength, the turret positioning a bandpass filter suitable for reading the barcode by the existing photosensitive element, or the barcode being read by using one or more photosensitive elements filtered at the wavelengths of the at least one light source (12).

17. A spectrophotometer for implementing the method as claimed in claim 8, characterized said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; the illuminator being an illuminator of 45/0° (5) or 0/45° (15) standardized geometry.

18. A spectrophotometer for implementing the method as claimed in claim 8, characterized said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; the illuminator being an integrating sphere illuminator with a standardized geometry of the diffuse/0° (13) or 0°/diffuse (14) type.

19. A spectrophotometer for implementing the method as claimed in claim 8, characterized said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; said at least one light source being a light-emitting diode focused onto the plane of the document.

20. A spectrophotometer for implementing the method as claimed in claim 8, characterized said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; said spectrophotometer being combined with a diode laser for reading monochrome linear barcodes.

21. A spectrophotometer for implementing the method as claimed in claim 8, characterized said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; said spectrophotometer being combined with several diode lasers of different wavelengths for reading color barcodes.

22. A spectrophotometer for implementing the method as claimed in claim 10, wherein said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; said spectrophotometer being combined with a diode laser for reading monochrome linear barcodes;

the diode lasers and the associated optics producing separate or merged light spots.

23. A spectrophotometer for implementing the method as claimed in claim 8, characterized said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; and wherein said spectrophotometer can be used in manual mode or in automatic mode.

24. A spectrophotometer for implementing the method as claimed in claim 8, characterized said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; and wherein, for use in manual mode, a pushbutton makes it possible:

by pushing briefly, to measure a single color area; or by maintained pressure, to initiate the operation of the continuous spectral measurement mode by scanning, the detection of an arbitrary sequence of successive color areas at the start of measurement of a line automatically causing the spectrophotometer to switch to barcode read mode, by turning off the illuminator and turning on the diode laser(s)

25. A spectrophotometer for implementing the method as claimed in claim 8, characterized said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; said spectrophotometer being combined with a diode laser for reading monochrome linear barcodes, wherein said spectrophotometer can be used in manual mode or in automatic mode and wherein the light spot(s) provided for reading barcodes are merged in the plane of the document reproduced, allowing spectral measurements over color areas of very small size, after calibration on a ceramic.

26. A spectrophotometer for implementing the method as claimed in claim 8, wherein said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned;

and wherein said spectrophotometer includes a display device that delivers indications such as the start and end of the measurements, the successful or unsuccessful decoding of a barcode, the current interrogation of a remote database, and the acceptance or rejection of a document.

27. The spectrophotometer as claimed in claim 13, wherein said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; wherein said spectrophotometer includes a display device that delivers indications such as the start and end of the measurements, the successful or unsuccessful decoding of a barcode, the current interrogation of a remote database, and the acceptance or rejection of a document, and wherein display device is a liquid-crystal or light-emitting diode device.

28. The spectrophotometer as claimed in claim 13, wherein said barcode is read by means of a modified spectrophotometer in order to allow reading by scanning said control range and said barcode, said modified spectrophotometer comprising:

a light spectrum analyzer having a light entry aperture;

an illuminator designed to illuminate said document produced over part of its surface;

a measurement aperture defining the illuminated area of the document, the reflection spectrum of which is measured, as is the barcode;

an optical link transmitting the light reflected by the illuminated color area to the spectrum analyzer;

a specialized electronic circuit, or software, which corrects the raw spectrum measured by scanning, over each measured wavelength band, by measuring in the absence of light and by measuring a known reflection spectrum standard;

at least one light source and its collimation optic, producing a visible, infrared or ultraviolet light spot whose size and wavelength are matched to the reading of the barcodes, and a photosensitive element that detects the reflected light when a barcode is being scanned; and an electronic processing circuit for shaping and decoding the received signal when a barcode is being scanned; and wherein said spectrophotometer includes a microprocessor for managing the control buttons of the apparatus, the turning-off and turning-on of the various light sources, the processing electronics, the barcode decoding electronics, all the calculations based on the acquired data, the communications with external computers, and the display devices.

* * * * *